Feb. 27, 1962  J. L. OWINGS  3,023,344
CORNERING LIGHTS
Filed Oct. 23, 1958

Jack L. Owings
INVENTOR.

United States Patent Office 3,023,344
Patented Feb. 27, 1962

3,023,344
CORNERING LIGHTS
Jack L. Owings, 721 Lincoln Ave., Woodland, Calif.
Filed Oct. 23, 1958, Ser. No. 769,240
5 Claims. (Cl. 315—83)

This invention relates to motor vehicle lighting and more particularly to an additional set of headlamps placed at an angle to the conventional headlamps of a motor vehicle for illuminating the area to the side of that lighted by the ordinary headlamps.

An object of the invention is to provide an additional pair of headlamps at the front of a motor vehicle for illuminating the areas of the road, highway or the like either on the left or on the right depending on the needs and desires of the motorist, particularly when turning a corner. The additional lamps have high beams and low beams, each under the control of the motorist thereby providing the same option in the additional lamps as is available to the motorist in his ordinary headlamps.

The purpose of the invention is to enable the motorist to see corners clearly at night, and therefore the additional lamps are mounted outboard of the ordinary headlamp and are set to direct the light beam at about an angle of approximately 20° to the illumination axis of the conventional headlamps. The additional lamps are to be used only when the motorist's judgment dictates that they shall be used, and the occasions for the lamps are numerous.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
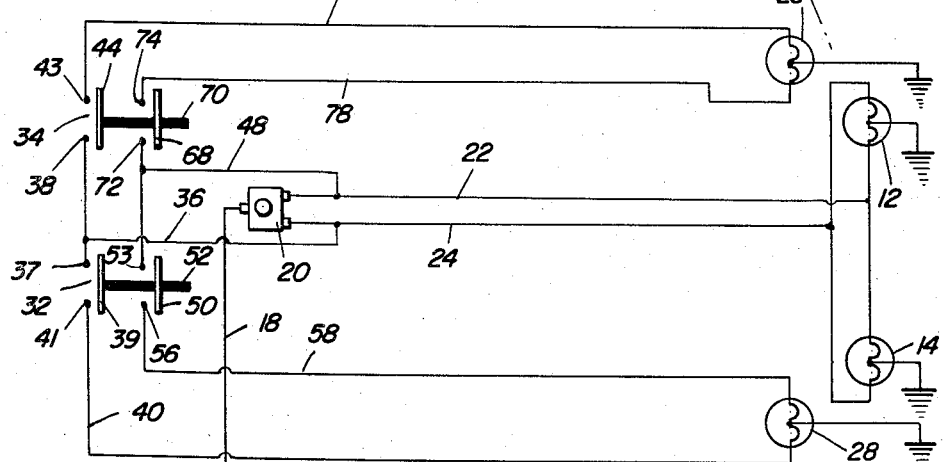
FIGURE 2 is a wiring diagram showing one preferred wiring arrangement for the headlamps.

In the accompanying drawings there is a motor vehicle 10 schematically representing any type of truck, bus, automobile or other land vehicle. The conventional headlamps 12 and 14 are shown at the front of the motor vehicle. These may be single lamps or in pairs, as has become popular in the last two years. FIGURE 2 shows headlamps 12 and 14 each provided with two filaments. This FIGURE also shows battery 16 as a source of electrical potential together with wire 18 extending from the source to dimmer switch 20. Wire 22 extends from a terminal on the dimmer switch to the high beam filaments of lamps 12 and 14, and wire 24 extends from the other terminal of dimmer switch 20 to the low beam filaments of the conventional headlamps 12 and 14. The lamps have their filaments grounded, as is conventional in most motor vehicles. The "on-off" switch of the motor vehicle headlights is not shown since it does not affect the invention.

The additional or auxiliary lamp 26 is mounted at the front of the motor vehicle and in position to direct its beam of light at approximately an angle of 20° to the general direction of the beam of light from lamp 12. The additional or auxiliary lamp 28 is similarly mounted but on the right side of the motor vehicle and outboard of conventional headlamp 14. Additional or auxiliary lamps 26 and 28 are double filament lamps, each having a high beam and a low beam that functions in coordination with the illumination, either high or low beams, of the conventional head lamps 12 and 14. The right auxiliary headlamp is controlled by switch 32 while the left auxiliary lamp is controlled by switch 34. When the low beam of the conventional headlamps is energized, wire 24, or the terminal at dimmer switch 20 to which it is connected, becomes energized, thereby energizing conductor 36 and energizing terminals 37 and 38 of switches 32 and 34. If switch 32 is closed, current will flow through contactor 39 of switch 32 and conductor 40 that is attached to terminal 41 of switch 32 and is bridged with terminal 37 upon closing the switch. Conductor 40 is connected with a low beam filament of lamp 28 and then to ground. Should the motorist desire to select the low beam of auxiliary lamp 26, he would close switch 34 thereby bridging terminal 38 and terminal 43 by the switch contactor 44. Current would then flow from wire 36 through contactor 44 and wire 46 to the low beam filament of auxiliary lamp 26 and then to ground. When either of these selections are made, that is either the low beam of the left auxiliary lamp or the low beam of the right auxiliary lamp, dimmer switch 20, due to the construction of the switch, has wire 22 non-conductive and therefore wire 48 which is connected to it or the terminal on dimmer switch 20 to which wire 22 is attached, does not conduct. Hence, the portions of switches 32 and 34 which control the high beams of the auxiliary lamps, do not conduct.

For switch 32, the high beam controlling portion thereof consists of contactor 50 on the same insulating plunger 52 as contactor 39, together with terminals 53 and 56 that are adapted to be bridged by contactor 50. Conductor 48 is attached to terminal 53, and conductor 58 is attached to terminal 56, so that when conductor 48 is energized and switch 32 is closed, current will flow through conductor 48, contactor 50 and conductor 58 to the high beam filament of the right auxiliary light 30. At this time, dimmer switch 20 is in such position that wire 36 does not conduct and therefore the low beam part of the circuit for auxiliary light 30 is open.

In order to select the high beam filament of auxiliary lamp 26, switch 34 is closed. It has contactor 68 on the same insulating plunger 70 as contactor 44. Contactor 68 bridges contacts 72 and 74 causing them to conduct current through conductor or wire 78, the high beam filament of auxiliary lamp 26 and then to ground.

Figure 1:
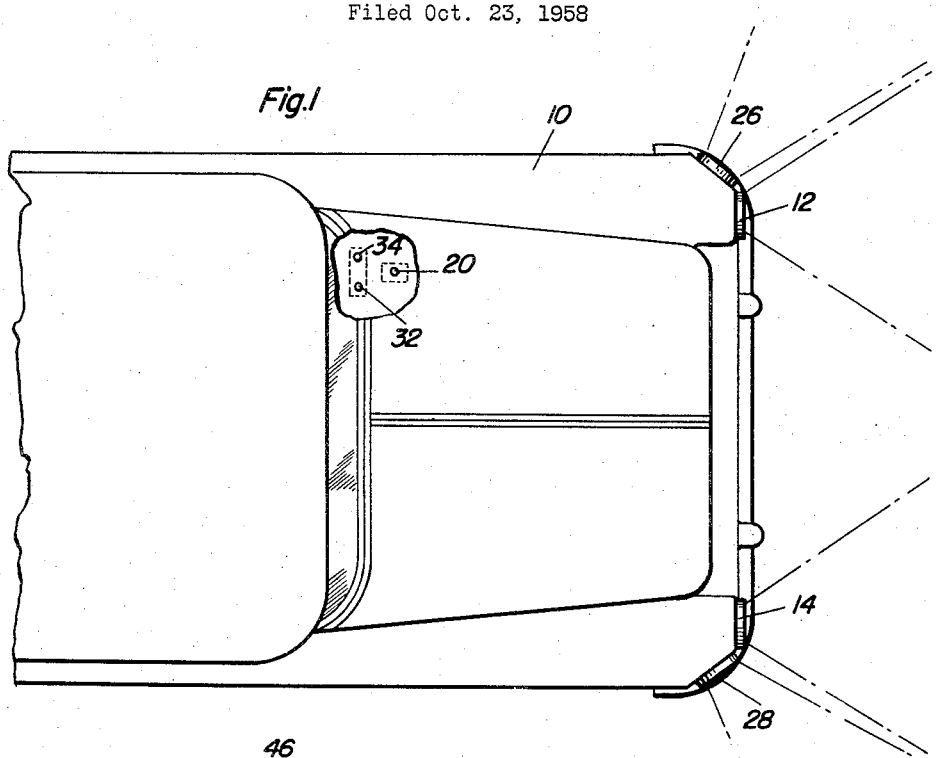
FIGURE 1 is a top view of a part of a motor vehicle with the additional lights connected therewith and the controls for them shown diagrammatically in dotted lines.

In installing switches 32 and 34, which are of the normally open type, it is preferred that switch 34 be located slightly below and to the left of dimmer switch 20 (FIGURE 1), and switch 32 be located slightly below and to the right of dimmer switch 20 so that the motorist's left foot can be used to select the high and low beams of the conventional headlamp by ordinary use of dimmer switch 20, and also select either the left or the right cornering lamp by tilting his foot to the left or to the right depending on which lamp is to be selected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a motor vehicle that has headlamps with high and low beams and a dimmer switch to energize the high and low beams respectively, auxiliary lamps mounted to direct their beams of light at an angle outboard of the beams from the conventional headlamps, each auxiliary lamp having a high beam filament and a low beam filament, each one of said auxiliary lamps having its high beam filament connected in a circuit with the portion of the dimmer switch which energizes the headlamp high beam filaments, each one of said auxiliary lamps having its low beam filament connected in a circuit with a portion of the dimmer switch which energizes the headlamp low beam filaments, a pair of auxiliary lamp switches, one of said switches connected to a first auxiliary lamp and adapted to close the circuit thereto for a selected filament of said first auxiliary lamp, the second of said switches connected to a second auxiliary lamp and adapted to energize the high or low beam filament selectively of said second auxiliary lamp and in response to the position of said dimmer switch.

2. The subject matter of claim 1 wherein said first and second lamps are mounted to direct their beams of light at an angle of approximately 20° to the axis of the beams of light emanating from the conventional headlamps and on the outboard side of said headlamps.

3. An auxiliary lighting system including a pair of auxiliary lamps for a motor vehicle to illuminate the sides of the road, wherein the motor vehicle has a dimmer switch with a high beam terminal and a low beam terminal, a first switch and a second switch, a pair of high beam contacts in said first switch and a pair of high beam contacts in said second switch, means for energizing one contact of each pair and connected to the high beam terminal of said dimmer switch, means connecting the other terminals of each pair to the high beam filaments of said auxiliary lamps, a second pair of contacts in said first switch, and, a second pair of contacts in said second switch, one contact of each of said second pairs of contacts connected for electrical conduction and connected to the low beam terminal of said dimmer switch, conductive means connected to each of the other contacts of said second pairs of contacts and to the low beam filament of said first auxiliary lamp, conductive means connected to each of the other terminals of said second pairs of contacts and to the low beam filament of said second auxiliary lamp so that the low beams of said auxiliary lamps may be selectively energized when said dimmer switch has its low beam terminal energized and a selected first or second switch is closed.

4. An auxiliary lighting system including a pair of auxiliary lamps for a motor vehicle to illuminate the sides of the road, wherein the motor vehicle has a dimmer switch with a high beam terminal and a low beam terminal, a first normally open switch and a second normally open switch, a pair of high beam contacts in said first switch and a pair of high beam contacts in said second switch, means for energizing one contact of each pair and connected to the high beam terminal of said dimmer switch, means connecting the other terminals of each pair to the high beam filaments of said auxiliary lamps, a second pair of contacts in said first switch, and, a second pair of contacts in said second switch, one contact of each of said second pairs of contacts connected for electrical conduction and connected to the low beam terminal of said dimmer switch, conductive means connected to each of the other contacts of said second pairs of contacts and to the low beam filament of said first auxiliary lamp, conductive means connected to each of the other terminals of said second pairs of contacts and to the low beam filament of said second auxiliary lamp so that the low beams of said auxiliary lamps may be selectively energized when said dimmer switch has its low beam terminal energized and a selected first or second switch is closed, said first switch located below and to the opposite side of said dimmer switch so that said first and second switches may be energized by the motorist rocking his foot to the left or right while maintaining his foot on the dimmer switch.

5. The combination of claim 4 wherein said auxiliary lights are mounted at the front of the motor vehicle, said motor vehicle has conventional headlamps at the front thereof, said auxiliary lamps on the outboard side of said conventional headlamps and arranged to direct the light beams at an angle outwardly of the light beams emanating from the conventional headlamps.

References Cited in the file of this patent
UNITED STATES PATENTS

| | | |
|---|---|---|
| 2,427,076 | Tabacchi | Sept. 19, 1947 |
| 2,476,382 | Pillus | July 19, 1949 |
| 2,542,211 | Sauri | Feb. 20, 1951 |
| 2,611,857 | Coulter | Sept. 23, 1952 |
| 2,675,438 | Pederson | Apr. 13, 1954 |
| 2,859,382 | Ellithorpe | Nov. 4, 1958 |